US012601965B2

(12) United States Patent
  Pikart et al.

(10) Patent No.: US 12,601,965 B2
(45) Date of Patent: Apr. 14, 2026

(54) µ-LED PROJECTION DEVICE AND METHOD FOR ITS MANUFACTURE

(71) Applicant: ams-OSRAM International GmbH, Regensburg (DE)

(72) Inventors: Philip Pikart, Munich (DE); Sergey Khrushchev, Regensburg (DE); Christian Gammer, Traitsching (DE)

(73) Assignee: ams-OSRAM International GmbH, Regensburg (DE)

( * ) Notice: Subject to any disclaimer, the term of this patent is extended or adjusted under 35 U.S.C. 154(b) by 222 days.

(21) Appl. No.: 18/564,218

(22) PCT Filed: May 25, 2022

(86) PCT No.: PCT/EP2022/064227
  § 371 (c)(1),
  (2) Date: Nov. 27, 2023

(87) PCT Pub. No.: WO2022/248562
  PCT Pub. Date: Dec. 1, 2022

(65) Prior Publication Data
  US 2024/0248381 A1 Jul. 25, 2024

(30) Foreign Application Priority Data
  May 27, 2021 (DE) ..................... 10 2021 113 695.4

(51) Int. Cl.
  *H04N 5/232* (2006.01)
  *G03B 21/20* (2006.01)
(52) U.S. Cl.
  CPC ..... *G03B 21/2013* (2013.01); *G03B 21/2033* (2013.01); *G03B 21/208* (2013.01)

(58) Field of Classification Search
  CPC ............ G03B 21/2013; G03B 21/2033; G03B 21/208; G03B 21/00; H10H 29/142; H04N 9/3138; H04N 5/7408
  See application file for complete search history.

(56) References Cited

U.S. PATENT DOCUMENTS 6,224,216 B1 5/2001 Parker et al.
7,637,627 B2 12/2009 Moffat et al.
(Continued)

FOREIGN PATENT DOCUMENTS

DE 102005044580 A1 4/2007
JP 2003330109 A 11/2003
(Continued)

OTHER PUBLICATIONS

C. Tsou et al., "The implementation and performance evaluation of a silicon-based LED packaging module with lens configuration," Microsyst Technol, Technical Paper, Mar. 26, 2013, 12 pages.
(Continued)

*Primary Examiner* — Howard D Brown, Jr.
(74) *Attorney, Agent, or Firm* — Slater Matsil, LLP

(57) ABSTRACT

In an embodiment a projection device includes an LED array on which a plurality of micro LEDs is arranged at regular intervals, projection optics spaced from the LED array and configured to receive light emitted from the LED array and to project the light onto a projection surface and a light collecting structure comprising individual protrusions, wherein the protrusions are optically coupled to individual LEDs of the LED array such that they restrict an angular space of light emitted by the individual LED and/or make an emission uniform.

14 Claims, 3 Drawing Sheets

(56) References Cited

U.S. PATENT DOCUMENTS

| | | | |
|---|---|---|---|
| 2005/0122487 A1 | 6/2005 | Koyama et al. | |
| 2007/0121085 A1 | 5/2007 | Dewald | |
| 2007/0263298 A1 | 11/2007 | El-Ghoroury et al. | |
| 2008/0151547 A1 | 6/2008 | Grotsch et al. | |
| 2009/0129230 A1 | 5/2009 | Grotsch | |
| 2009/0230893 A1 | 9/2009 | Hohl-Abichedid et al. | |
| 2020/0412098 A1 | 12/2020 | Shimizu et al. | |
| 2021/0044748 A1* | 2/2021 | Hu | G02B 13/06 |
| 2021/0211618 A1 | 7/2021 | Silverstein et al. | |
| 2022/0269075 A1* | 8/2022 | Yang | G02B 27/0103 |
| 2022/0269076 A1* | 8/2022 | Yang | G02B 6/0016 |
| 2024/0248381 A1* | 7/2024 | Pikart | G03B 21/2013 |
| 2024/0355148 A1* | 10/2024 | Zurauskas | G02B 27/0093 |

FOREIGN PATENT DOCUMENTS

| | | |
|---|---|---|
| JP | 2007049062 A | 2/2007 |
| JP | 2008532297 A | 8/2008 |
| JP | 2008533726 A | 8/2008 |
| JP | 2009512151 A | 3/2009 |
| JP | 2014107051 A | 6/2014 |
| WO | 2019097431 A1 | 5/2019 |

OTHER PUBLICATIONS

S. Lan et al., "Strategically constructed patterned sapphire with silica array to boost substrate performance in GaN-based flip-chip visible light-emitting diodes," Optics Express, vol. 28, No. 25, Dec. 7, 2020, 12 pages.

* cited by examiner (a)

(b)

(c)

(d)

μ-LED PROJECTION DEVICE AND METHOD FOR ITS MANUFACTURE

CROSS-REFERENCE TO RELATED APPLICATIONS

This patent application is a national phase filing under section 371 of PCT/EP2022/064227, filed May 25, 2022, which claims the priority of German patent application 10 2021 113 695.4, filed May 27, 2021, each of which is incorporated herein by reference in its entirety.

TECHNICAL FIELD

The invention starts from a conventional μ-LED projection device, i.e. a projection device with known very small light emitting diodes (hereinafter μ-LEDs, light emitting diodes).

BACKGROUND

Traditionally, μ-LEDs are not yet widely used for projection applications in the consumer sector. Instead, other technologies such as DLP ("digital light processing") technology or (transmitted or reflected) LCD technology are predominantly used, which employ conventional LEDs.

In DLP (Digital Light Processing) technology, the light is imaged onto the projection surface via a DMD ("Digital Micromirror Device"), which is a chip containing up to 2.2 million microscopically small mirrors arranged at right angles. These are moved with the help of a tiny electrode under each mirror. Each mirror is mounted on a joint and can thus be rotated toward or away from the light source.

To produce colored images, the mirror array is illuminated sequentially in time with the three primary colors R, G, and B, and the resulting images are superimposed on the projection surface. To accomplish this, a white light source often shines onto the DMD through a rapidly rotating "ColorWheel" or color wheel, which has three distinct segments, each of which transmits light of a particular color (red, green or blue). The rotation is synchronized with the tilting of the micromirrors to produce the desired image of each color.

The second widely used projection technology besides DLP is LCD technology. LCD projectors generate their image with the help of transparent liquid crystal displays (as the name "LCD", Liquid Crystal Display, suggests). They work in a similar way to a conventional slide projector. With one difference—instead of the slide, LCD projectors have one or three (one for each RGB color) LCDs built in. Depending on the applied electrical field, the orientation of the LCD's crystals changes, allowing more or less light to pass through. Since LCD displays are comparatively cheap today, each basic color (red, green, blue) gets its own display. This means that there is no time-shifted projection of the basic colors here (no rainbow effect). The three light beams leave the projector's lens system simultaneously via a dichroic mirror.

A variant of this uses reflective LCDs. In these, the fact that the polarization of the light changes upon reflection can be used to couple out the light. For example, US 2004 145 706 A1 shows such a variation of the above principle with advantages in the design of the optical path.

More and more projection applications are also being used in the automotive sector, for example in dynamic interior projections such as so-called "head-up displays" or dynamic "welcome light" outdoors. However, certain disadvantages of conventional white-light projectors come into play here; for example, the classic bright light sources such as incandescent bulbs are relatively sensitive to vibration, and the mechanical components such as color wheels are also noisy, which can be problematic, especially in the luxury car sector and with regard to quieter interiors, particularly in future electric vehicles. In addition, such a setup is relatively large because either three beam paths for three LCDs as well as the recombination of the same or the space for the color wheel must be provided, so that a reduction in size encounters difficulties due to the principle.

In all of these processes, white light is split into primary colors (usually red, green, and blue) and then, depending on the primary color and the desired image, is either transmitted to the projection surface or blocked or (in the case of DMD) directed out of the protrusion beam path (and subsequently absorbed) to produce the desired image. Thus, these systems are subtractive systems that, by design, cannot fully utilize the light generated. In other words, light must be absorbed to display dark/black pixels.

As an alternative, LED arrays are conceivable, such as those that form the basis for conventional flat screens. Newer developments can further reduce the size of the LEDs, so that one speaks of μLEDs or micro-LEDS. The μLEDs are arranged as a matrix or array, and the LED chips themselves have an edge length in the range of μm (millionths of a meter). The pixel pitch is e.g. a few μm to a few 10 μm. Such a matrix can consist of RGB LEDs, but a single-color (monochromatic) matrix is also conceivable for other applications.

However, these μ-LEDs have too low brightness in conventional setups because they emit into a wide half-space angle, so that downstream conventional imaging optics cannot pick up and project enough light.

On the other hand, LEDs are known to be combined with light collecting structures to improve optical outcoupling. For example, S. Lan, B. Tang, H. Hu, and S. Zhou explain in "Strategically constructed patterned sapphire with silica array to boost substrate performance in GaN-based flip-chip visible light-emitting diodes," Opt. Express 28, 38444-38455 (2020), to increase the efficiency of GaN LEDs (gallium nitride-based light-emitting diodes) by using cone-shaped patterned sapphire with silica array (PSSA) as the base on which the LEDs are built. This increased the luminous efficacy of the Leds by 16.5% by making better use of light otherwise emitted backwards in the optical path that reflected off the PSS structures.

Tsou, Chingfu & Chang, Chunming & Lai, Tenghsien & Huang, Chenghan. (2013) describe in "The implementation and performance evaluation of a silicon-based LED packaging module with lens configuration.", Microsystem Technologies. 19. 10.1007/s00542-013-1773-4, a transfer molding process for silicon-based LEDs with an aspherical lens and a microlens matrix. For this purpose, microelectromechanical techniques, essentially conventional ablative techniques, but on a miniature scale, are used to fabricate a mold. This mold is then transferred to epoxy and silicone gel envelopes of the wafer by indentation, resulting in precise and repeatable alignment of the lens assembly and reflector to the silicon wafer. The increase in brightness and fill factor with just one aspherical lens is reported to be 16 to 26% compared to an unstructured curved surface. In addition, the illumination is unified.

SUMMARY

Embodiments provide an improved projection device for LEDs, in particular micro-LED arrays. In principle, however, the application of the invention is not limited to micro-LEDs.

A projection device for LED arrays according to the invention comprises an LED array on which, for example, a plurality of micro-LEDs is arranged at regular intervals, and a projection optics spaced from the LED array and capable of receiving light emitted by the array and projecting it onto a projection surface. The projection device according to the invention further comprises a light collecting structure having individual protrusions, the protrusions being optically coupled to individual LEDs of the LED array in such a way as to restrict the angular space of a light emitted by the individual LED and/or to make the emission uniform.

Such a projection device according to the invention comprises a light collecting structure, which usually sits directly on the (micro-)LEDs and collects virtually all of the emitted light from the individual LEDs or LED arrays, e.g. RGB arrays of LEDs. Thus, this structure reduces the beam angle before the light is coupled into the projection optics. Therefore, it results in a greater light output, making LED protrusion brighter and thus possible for many applications in the first place. In addition, the light collecting structure can be fabricated with high accuracy and low cost using well known processes, such as photochemical etching. In addition, this structure has a very short structure in the optical path, so that a corresponding projection optics can be set up much more compactly. Furthermore, because the structure according to the invention enables the use of LEDs for bright projectors, these can be constructed more simply compared to the prior art. Thus, only one LED array is required compared to the three LCDs or DMD and color wheel described for the prior art, and therefore neither precise synchronization of mechanical components (color wheel and DMD) nor precise alignment and synchronization of three optical paths (through three LCDs) with each other is required. Therefore, the arrangement according to the invention can be incorporated in lower cost yet high performance projection optics.

Particularly preferably, the light collecting structure has conical protrusions. The uppermost surface of the conical protrusions is thereby coupled with an LED or a part of the array that emits a light spot of the image to be projected. If the protrusions are conical, i.e. cone-shaped, the light from an LED or array of multiple LEDs can be expanded under the cone to form a wider light spot. This makes it possible to make the spaces necessary between the LEDs for switching wires and the like completely invisible in the image even before the projection optics. Such a taper functions analogously to a taper in fiber optics when two fibers of different thickness are connected. A particular advantage is that the necessary distances between the LEDs can remain relatively large without impairing the quality of the image.

If the projection device is placed in a medium with a lower refractive index than the refractive index of the light collecting structure, for example in air or water, which have a lower refractive index than the typical refractive index of about 1.5 for silicon oxide, and moreover the cone angles are adjusted accordingly to the maximum emission angles of the associated LEDs, all the light from the LEDs is retained in the cone by total internal reflection and goes to the exit surface of the light collecting structure opposite the LED. Alternatively, the cones can be externally mirrored, for example by vapor deposition or sputtering, to ensure that even in indeterminate environments all the coupled light exits the light collecting structure on the side opposite the LED and can be used for protrusion. Both options can be used to further optimize the light yield.

A protrusion or taper can cover one (micro)LED or multiple (micro)LEDs such that it is coupled to it. When a protrusion covers multiple LEDs, it is preferable that for colored arrays (e.g., arrays of red, green, and blue LEDs) each covers an LED array that provides white light overall. In such a case, for each protrusion from the light collecting structure, a point of arbitrary color and optimum brightness can be generated and imaged by the projection device. In the case of single-color LED arrays, such an arrangement has the advantage that the brightness can be controlled in steps by switching LEDs on or off, in addition to (conventional) control via pulse width modulation, for example.

Typically, the protrusions of the light collecting structure are likely to rest flat on the planar surfaces of the LEDs of the corresponding array to achieve ideal coupling. However, it is also conceivable that the light collecting structure has a curved and thus optically effective surface in order to collect the beams emanating from the associated LEDs or otherwise to provide an imaging step already at this point. This can also possibly further increase the light yield.

In addition to the device, the method for manufacturing the device with the above features is also claimed.

BRIEF DESCRIPTION OF THE DRAWINGS

In the following, the invention will be explained in more detail with reference to an example(s) of an embodiment.

DETAILED DESCRIPTION OF ILLUSTRATIVE THE EMBODIMENTS

Figure 1:
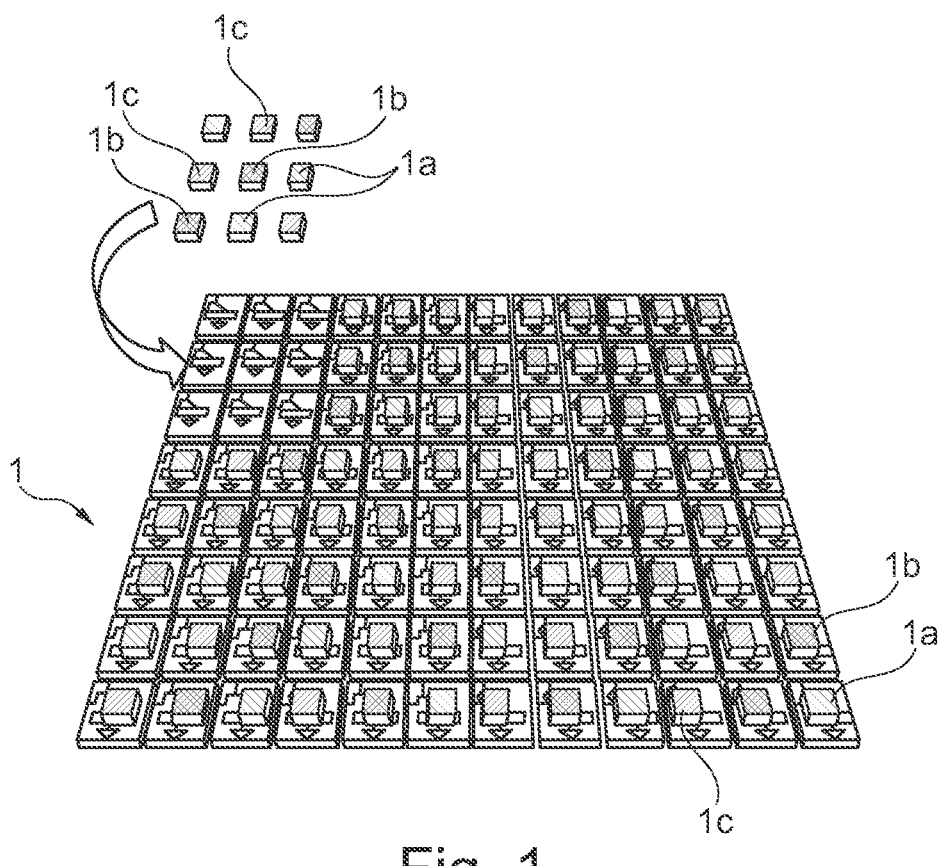
FIG. 1 shows an example of a conventional LED array that can be used in one embodiment of the invention.

FIG. 1 shows an example of a micro LED array or p LED array as an example of an LED array 1 (hereinafter referred to as an array for short) for use in a projection device according to the invention. In this embodiment, a colored array is used in which LEDs of the three primary colors red (R), green (G), and blue (B) are arranged in a predetermined pattern. For representation in black and white, the symbol chosen here for red light is a hatching from bottom left to top right, for blue light a hatching from top left to bottom right, and for green light a cross-hatching.

Such an array emits colored light, depending on the control, so that a bright image can be directly generated additively. Many flat screens use analog arrangements not only with micro-LEDs, but also with conventional LEDs or OLEDs (organic LEDs). The possible arrangements of LEDs are comparable, even if the scales are different. Therefore, the possible arrangements of colored LEDs (or μ-LEDs or micro-LEDs) are well known and will not be described. Of course, single-color μ-LED arrays could also be used for simple protrusions.

Figure 2:
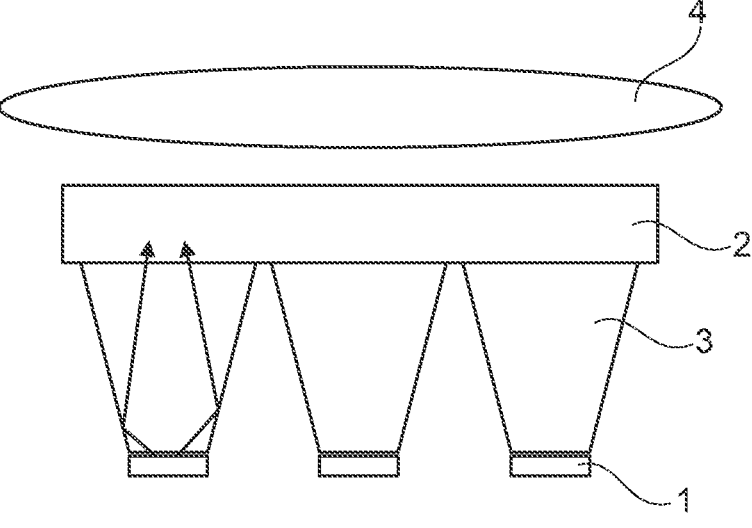
FIG. 2 shows an example of a light collecting structure according to the invention on individual μ-LEDs of a μ-LED array from FIG. 1.

FIG. 2 shows an example of a light collecting structure according to the invention using the example of a PSS (patterned sapphire substrate) or PSSA (patterned sapphire with silica array) structure 2. The fabrication of such a structure is known in principle (cf. the articles cited as prior art) and is therefore only explained here in general terms. First, a sapphire substrate is coated with a protective layer, for example of $SiO_2$. A photoresist is applied to this layer, which is then exposed via lithography optics with a desired structure. Unexposed parts of the resist are then removed and the exposed SiO$_2$ and the underlying sapphire layer are etched away. This process in itself is well known from semiconductor manufacturing and it is also possible to perform multiple coating, exposure and etching steps to create more complex geometries. High-precision structures can be generated in this way. In the present case, the goal is to form structures such that the finished substrate has protrusions 3 that match the micro-LEDs on the μ-LED array 1. That is, the centers of the protrusions of the light collecting structure have equal distances to each other as the centers of the micro-LEDs to each other, in other words, the protrusions are congruent with the micro-LEDs.

In the next step, the light collecting structure 2 is optically coupled to the μ-LED array 1, i.e. in the simplest case they are placed on top of each other and pressed together (for example with external clamps or the like). Alternatively, cementing or some other form of assembly is also possible. Crucially, the array and light collecting structure must be aligned such that each protrusion is optically coupled to the associated μ-LED. Appropriate alignment can be achieved, for example, by providing matching protrusions and recesses in components 1 and 2 outside the optically effective area, which fit into each other when placed on top of each other and align the light collecting structure 2 and the μ-LED array 1 with each other.

In this way, a protrusion 3 of the light collecting structure then lies on each μ-LED of the array 1 so that they are optically coupled to each other. As shown in FIG. 2 by two exemplary beams, light beams emitted upward in any direction in half-space, which are shown in the figure by bent arrows, are collected by total reflection in the protrusion 3, which is tapered here, and emitted to the projection optics 4.

Thus, all the light emitted by the μ-LED array is absorbed in the PSS structure as the light collecting structure 2 and sent into the protrusion lens. This achieves a much higher light output than would be possible without the light collecting structure 2.

Figure 3A:
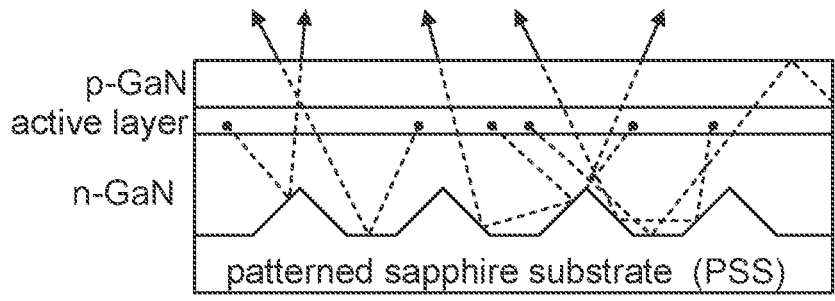
FIG. 3 shows a basic operation of the structures for improving optical outcoupling.
Figure 3B:
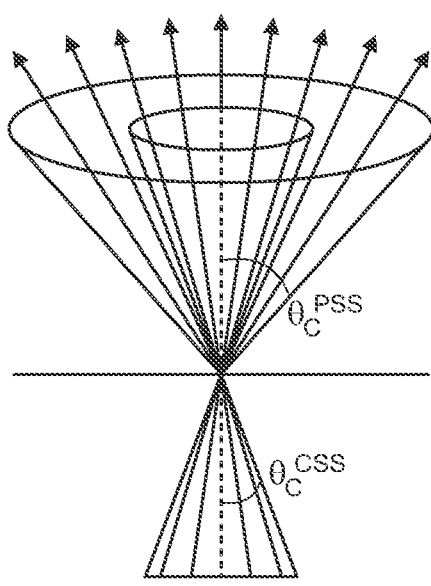

PSS structures are used in the prior art to improve optical outcoupling in LEDs. FIG. 3*a* shows a PSS structure used as a reflective light collecting structure. Here, an LED with n- and p-doped GaN layers is deposited on a PSS. The light emerging from the active layer between p-doped and n-doped layers is initially emitted in all directions, but is reflected at the patterns in such a way that the emission angle is restricted, as can be seen from the comparison of angles $\theta_C^{PSS}$ (as the emission angle without a special patterned structure) and $\theta_C^{CSS}$ (as the emission angle with the patterned PSS structure shown) in FIG. 3*b*, which quasi-three-dimensionally illustrates the rays shown in FIG. 3*a* emanating from a specific point. It should be noted that the refraction of the beams at the transition from the LED into air in FIG. 3*a* has been neglected because it affects the reduction of the beam angle only with a fixed factor depending on the refractive index of the (here p-doped) GaN surface and independently of the effects relevant here.

Figure 4:
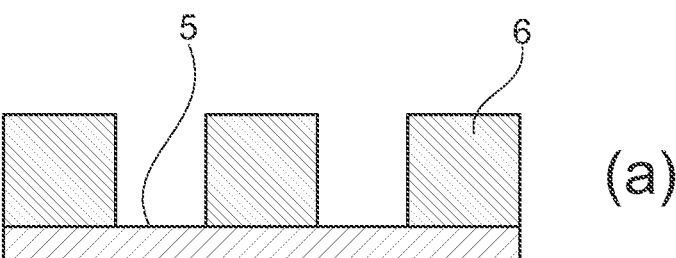
FIG. 4a to 4d show possible shapes of the light collecting structure according to further embodiments.
Figure 4:
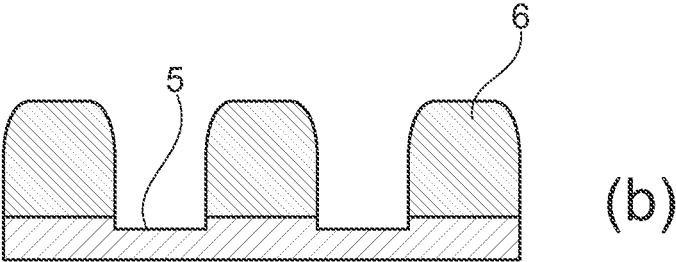
Figure 4:
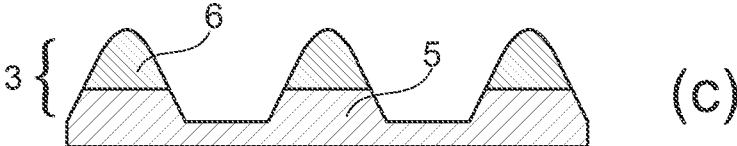
Figure 4:
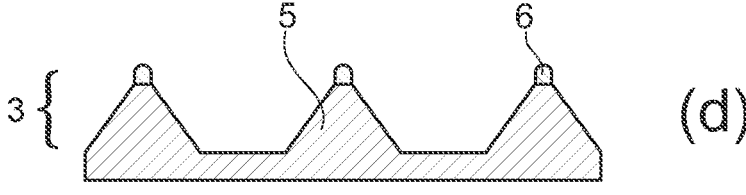

FIGS. 4*a* to 4*d* again illustrate, as described above, an example of shapes of protrusions of a PSS structure as a light collecting structure that can be produced by lithography and subsequent etching. As can be seen from top to bottom, a photoresist 6 is first applied (FIG. 4 *a*) and exposed in a structured manner, and then a (here tapered) structure of protrusions of the sapphire substrate 5 is produced by removing the unexposed portions of the photoresist 6 along with etching (FIGS. 4*b* and 4*c*). As a final result, the structure shown in FIG. 4*d* can be produced as an example, which is then placed on a micro-LED array as illustrated in FIG. 2 to produce the projection device according to the invention. As mentioned, these structures can be produced with high precision and quality in a well-controlled shape, which makes them well suited to the necessities determined by the optics in terms of geometry.

In the present embodiment, an example has been shown in which the surface that rests on the LED is a flat surface. However, it is also conceivable to manufacture the light collecting structure in such a way that it projects, for example, into the spaces between the micro-LEDs of the micro-LED array 1 and completely surrounds the LEDs 1*a*, 1*b*, 1*c*. This could enable even better coupling of the emitted light, and can also simplify the alignment of the two components with respect to each other. In addition, the surface of the light collecting structure that couples with the micro-LEDs 1*a*, 1*b*, 1*c* can also be curved to already act as a "first lens". Also in this way, the light efficiency of the projection device can be further increased. The corresponding design of the surface of the light collecting structure 2 coupling with the micro LEDs 1*a*, 1*b*, 1*c* is thus not limited to the plane surface shown in the embodiment example, but can be adapted depending on the application.

Should it be recognized in an application that the total reflection in the light collecting structure 2 is not sufficiently effective and too much light already leaves the light collecting structure at the outer surface of the protrusions, it is also possible to mirror this structure, similar to the example illustrated in the prior art in FIG. 3*a*. This allows even more stray light to be collected and used.

The invention claimed is:

1. A projection device comprising:
   an LED array on which a plurality of micro LEDs is arranged at regular intervals;
   projection optics spaced from the LED array and configured to receive light emitted from the LED array and to project the light onto a projection surface; and
   a light collecting structure comprising individual protrusions,
   wherein the protrusions are optically coupled to individual LEDs of the LED array such that the protrusions restrict an angular space of light emitted by the individual LEDs and/or make an emission uniform.

2. The projection device according to claim 1, wherein the light collecting structure comprises conical protrusions.

3. The projection device according to claim 2,
   wherein the projection device is arrangeable in a medium with a lower refractive index than that of the light collecting structure, and
   wherein cone angles of the protrusions have combinations of a cone angle and a refractive index matched to maximum emission angles of the LEDs such that in-coupled light of the LEDs exits the light collecting structure by total reflection in the protrusions only on a side opposite the LEDs.

4. The projection device according to claim 3, wherein the medium with the lower refractive index is air.

5. The projection device according to claim 1, wherein the light collecting structure optically couples the plurality of micro LEDs having different color emissions to a common protrusion.

6. The projection device according to claim 1, wherein all surfaces of the light collecting structure facing the LEDs, with an exception of surfaces that are coupleable to the micro LEDs, are provided with a reflective coating.

7. The projection device according to claim 1, wherein surfaces of the protrusions that are coupleable to the LEDs comprise curvatures.

8. A method for manufacturing the projection device according to claim 1, the method comprising:

provide the LED array;

providing the light collecting structure with the protrusions matching the LEDs on the LED array; and connecting the light collecting structure with the LED array such that each protrusion is optically coupled to at least one LED.

9. The method according to claim 8, further comprising manufacturing the protrusions in a conical shape tapered towards the LED array.

10. The method according to claim 8, further comprising:

arranging the projection device in a medium with a lower refractive index than that of the light collecting structure; and matching cone angles of the protrusions to maximum emission angles of the LEDs and a refractive index of a material of the protrusions such that the in coupled light of an associated LED exits the light collecting structure by total reflection in the protrusions only on a side opposite the LED.

11. The method according to claim 10, wherein the medium with the lower refractive index is air.

12. The method according to claim 8, further comprising coupling a protrusion with a plurality of associated micro-LEDs.

13. The method according to claim 8, further comprising mirroring all surfaces of the light collecting structure facing the LED array except for surfaces that are coupleable to the micro LEDs.

14. The method according to claim 8, further comprising manufacturing the protrusions such that surfaces of the protrusions that are coupleable to the micro LEDs comprise curvatures.

* * * * *